Aug. 21, 1923.
D. E. STETLER
1,465,374
EYESHIELD FOR AUTOMOBILE WINDSHIELDS
Filed Jan. 16, 1922
2 Sheets-Sheet 1
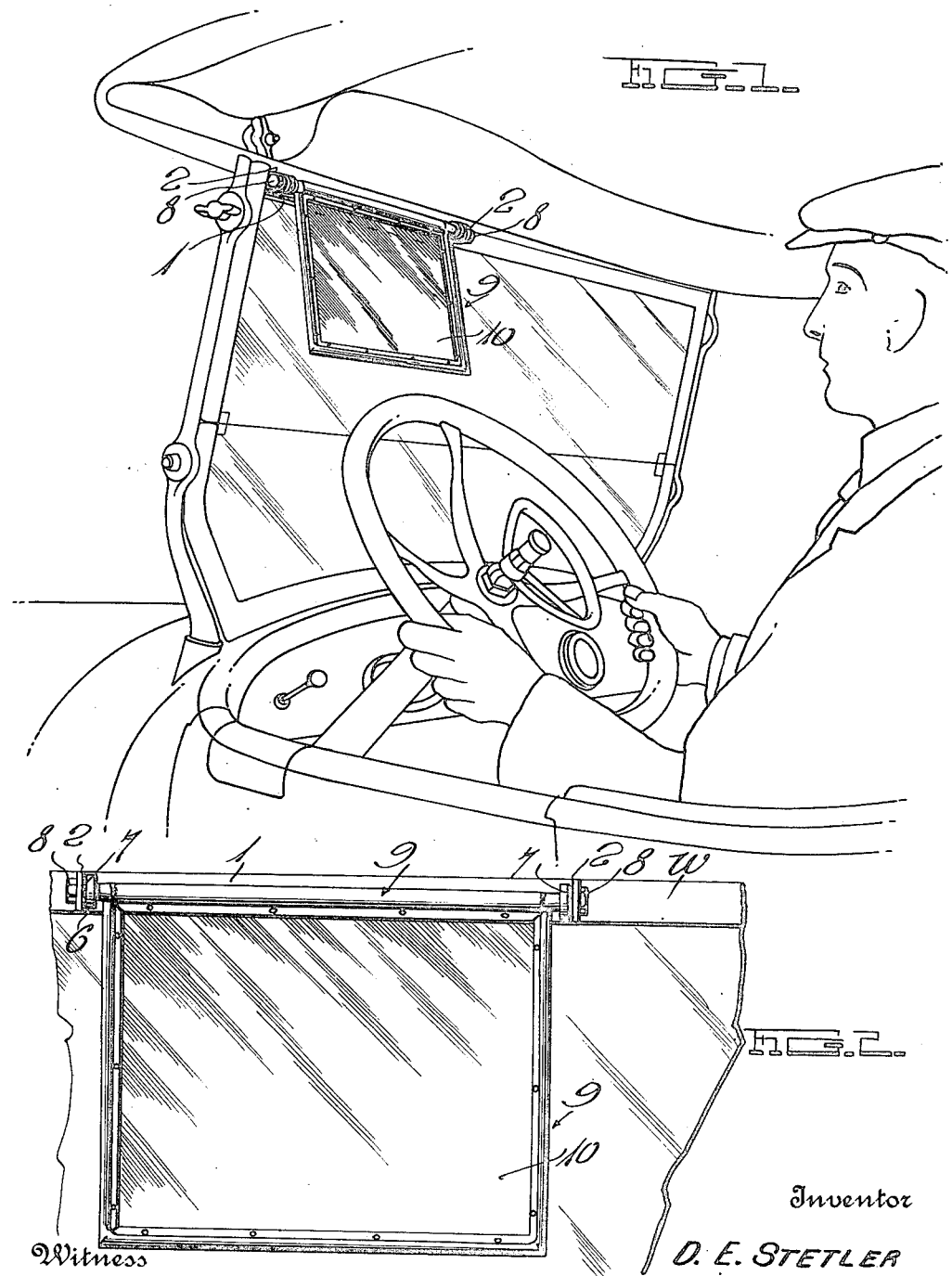
Witness
H. Woodard
Inventor
D. E. Stetler
By (attorney signature)
Attorneys

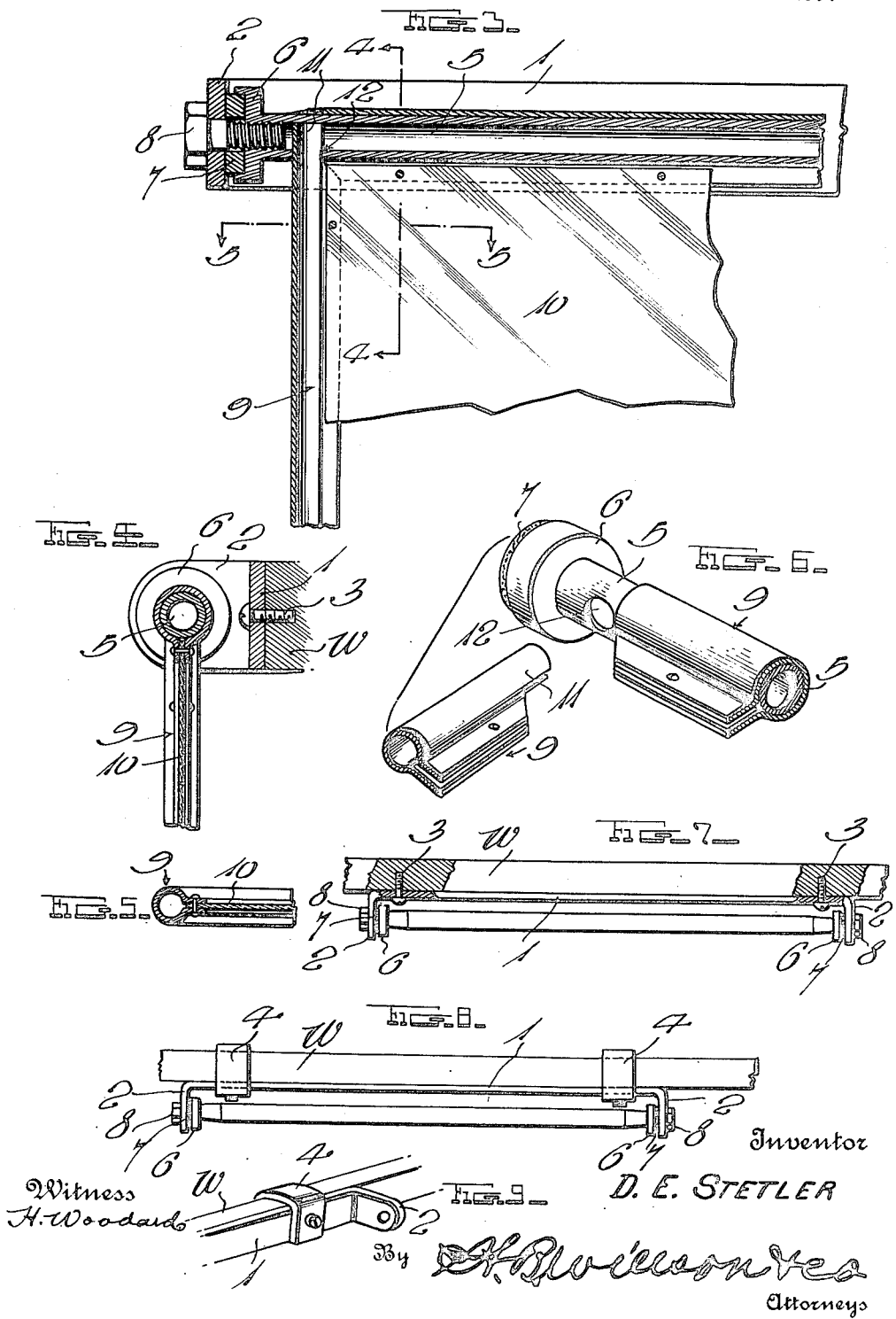

Patented Aug. 21, 1923.

1,465,374

UNITED STATES PATENT OFFICE.

DANIEL E. STETLER, OF WELLINGTON, KANSAS.

EYESHIELD FOR AUTOMOBILE WINDSHIELDS.

Application filed January 16, 1922. Serial No. 529,750.

*To all whom it may concern:*

Be it known that I, DANIEL E. STETLER, a citizen of the United States, residing at Wellington, in the county of Sumner and State of Kansas, have invented certain new and useful Improvements in Eyeshields for Automobile Windshields; and I do declare the following to be a full, clear, and exact description of the invention, such as will enable others skilled in the art to which it appertains to make and use the same.

This invention relates to an improved eye shield for attachment to automobile windshields, it being the principal object of the invention to provide a novel device of this character to be attached to the upper section of the windshield on the inner side thereof at a point in the line of vision of the driver when in use, whereby it will function to modify and decidedly dull the radiating rays from the headlights of approaching machines.

It is another object of the invention to devise an eye shield of this class which is capable of being placed and held at any angle with respect to the windshield and is also capable of being swung up at right angles to the windshield to position it out of the line of vision of the driver.

A further object of the invention is to devise an eye shield embodying novel friction means cooperative with the attaching brackets or means for maintaining the shield against accidental movement after being moved to the desired angle with respect to the windshield.

Other objects and advantages of the invention will be apparent during the course of the following description.

In the accompanying drawings forming a part of this specification and in which like numerals are employed to designate like parts throughout the same:

Figure 1 is a perspective view of a portion of an automobile and its windshield showing the improved eye shield in operative position thereon.

Figure 2 is an enlarged elevational view of the shield disposed in substantial parallelism with respect to the windshield section on which it is mounted.

Figure 3 is an enlarged sectional view of one corner of the device showing the construction of the details more clearly.

Figures 4 and 5 are sectional views taken substantially on the planes of the lines 4—4 and 5—5 respectively of Fig. 3.

Figure 6 is an enlarged perspective view of one corner of the shield showing the construction of the frame and friction means more clearly.

Figure 7 is a top plan view showing the manner of connecting the attaching brackets to the windshield parts thereof being broken away.

Figure 8 is a view like Figure 7 showing the bracket connected with the windshield in a slightly different manner.

Figure 9 is a perspective view of one end of Figure 8 with the shield and mounting means removed.

Broadly speaking, the invention comprises an attaching bracket which is designed to be connected with the upper windshield section by means of clamps or suitable fastenings, together with an eye shield including among other details, a sheet of translucent material and novel friction means for co-action with the bearings at the opposite end of the bracket for automatically maintaining the shield in various angular positions with respect to the windshield.

Referring to the drawings in detail, it will be seen that the numeral 1 designates the attaching bracket which is simply formed from a strip of metal having its opposite ends bent laterally in the same direction as indicated at 2 and apertured to provide bearings. In most instances, the bracket will be connected with the upper windshield section W by means of small screws or fastenings 3. However, in some instances, I find it desirable to attach the bracket to the windshield by means of U-clips or clamps 4 (for instance as shown in Figs. 8 and 9). In order to secure effective results, I form the strip from which the attaching bracket is constructed, of comparatively resilient metal so that the laterally bent ends 2 are permitted to be flexed toward each other when acted on in a manner to be hereinafter described.

As before indicated, a novelly constructed shield is adjustably connected with the attaching bracket so that it can be swung down in front of the driver's eyes to modify light or sun rays which pass therethrough. I wish it to be understood that when speaking of the eye shield, it should be broadly construed as including all details with the exception of the clamping or journal bolts and the attaching bracket and connecting means therefor. Specifically described, the improved shield includes a tubular shaft 5 having recessed heads 6 at its opposite ends which function as cups and serve to contain leather washers 7 which are adapted to bear against the inner sides of the aforesaid bearings 2 whereby to function as friction retaining means for the shield. By carefully examining Figure 3 it will be seen that the tubular shaft is internally screw-threaded at its opposite ends and combined journal and clamping bolts 8 are passed through the bearing openings in the bracket ends 2 and the threaded ends of the bolt are engaged with the threads of the shaft. When the bolts 8 are tightened, the laterally bent ends of the brackets are moved slightly towards each other so as to bring about friction between them and the washers. Connected with the shaft 5 is a substantially rectangular metal frame 9 carrying a piece of colored (preferably green) translucent material 10. Inasmuch as the frame 9 is substantially conventional in construction, it need not be described specifically. However, it may be mentioned that the horizontal top piece of the frame is comparatively large and is sufficient in size to surround the aforesaid tubular shaft to provide a novel manner of connecting the frame with the shaft. It may be also mentioned (see Fig. 6) that it is desirable when constructing the frame to cut away a portion of the retaining flanges of the vertical side piece of the frame as shown in the figure referred to so as to permit the tubular part to extend beyond the flanged portion as indicated at 11, and to permit this extended part to be projected into an opening 12 formed in the shaft 5. After the parts are thus connected together, they are soldered so as to maintain them in fixed relative position.

In practice, the attaching bracket 1 is secured to the rim of the upper windshield section W by clamps or fastenings and is arranged in a position so that when the shield is swung down, it will be in the line of vision of the driver. When not in use, the shield is swung upwardly at right angles with respect to the windshield and is thus disposed beneath the top of the automobile and does not interfere in any way with the driver's vision. Now, assuming that a machine is approaching, the shield is grasped and swung down to the desired angular position with respect to the windshield. Consequently, the rays of light which shine through the translucent sheet will be decidedly modified and the glare overcome to such an extent as to prevent interference of the glaring headlights with the eyes of the driver. The novel friction means hereinbefore described serves to maintain the shield in the various angular positions to which it is moved.

Windshield attachments constructed as herein shown and described have been actually made and used and have proven to be successful both for affecting the light from approaching automobiles, and preventing the glare of the sun from affecting the driver's vision. Although this result is effectively accomplished, the driver is permitted to clearly view the path of travel ahead of him to prevent accidents by running off of the same. Consequently, a novel safety device has been provided which is comparatively simple in construction, inexpensive to manufacture and such in construction that the shield is adjustable to various angles to enable it to be positioned at the most advantageous point for dulling the light rays regardless of at what angle they are projected through the windshield.

By carefully considering the description in connection with the drawings, persons familiar with devices of this class will doubtless be able to obtain a clear understanding of the invention. Therefore, a more lengthy and detailed description is deemed unnecessary.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:

1. A device of the class described embodying an eye shield having a frame formed of substantially tubular side portions equipped with spaced flanges between which the transparent material is secured, the flanges of one of said side portions terminating inward of the tubular part to provide an extension, a tubular shaft extending through the horizontal top tubular portion of said frame, said shaft having its ends extending beyond the frame and formed with enlarged recessed heads providing cups adapted for receiving friction washers, said shaft being provided an aperture adjacent one end into which the aforesaid extension projects.

2. A windshield attachment comprising a bracket adapted to be connected to the windshield, said bracket being in the form of a bar having its ends directed laterally in the same direction and formed with bearing openings, an eyeshield embodying a tubular shaft provided at its ends with enlarged recessed heads forming cups, the shaft being internally threaded adjacent said cups, flat apertured washers seated in the heads and frictionally engaging the inner faces of the aforesaid laterally directed ends of the bracket and the recessed shaft head, and journal-bolts passing through the bearing openings and openings in the washers and having their threaded ends positively engaging the threaded interior portions of said shaft, whereby to permit the washers to bind tightly against the aforesaid laterally directed ends and heads for frictionally locking the shield in various adjusted positions.

In testimony whereof I have hereunto set my hand.

DANIEL E. STETLER.